(12) United States Patent
Holt

(10) Patent No.: US 7,739,349 B2
(45) Date of Patent: Jun. 15, 2010

(54) SYNCHRONIZATION WITH PARTIAL MEMORY REPLICATION

(75) Inventor: John M. Holt, Essex (GB)

(73) Assignee: Waratek Pty Limited, Lindfield, New South Wales (AU)

( * ) Notice: Subject to any disclaimer, the term of this patent is extended or adjusted under 35 U.S.C. 154(b) by 149 days.

(21) Appl. No.: 11/973,326

(22) Filed: Oct. 5, 2007

(65) Prior Publication Data

US 2008/0126508 A1    May 29, 2008

Related U.S. Application Data

(60) Provisional application No. 60/850,450, filed on Oct. 9, 2006, provisional application No. 60/850,537, filed on Oct. 9, 2006.

(51) Int. Cl.
| | | |
|---|---|---|
| G06F 15/16 | (2006.01) | |
| G06F 15/167 | (2006.01) | |
| G06F 12/00 | (2006.01) | |
| G06F 13/00 | (2006.01) | |
| G06F 13/28 | (2006.01) | |

(52) U.S. Cl. .................. 709/213; 709/201; 709/205; 711/147; 711/148

(58) Field of Classification Search .............. 709/201, 709/213, 205; 711/147, 148
See application file for complete search history.

(56) References Cited

U.S. PATENT DOCUMENTS 6,148,377 A * 11/2000 Carter et al. ............... 711/147
6,370,625 B1 * 4/2002 Carmean et al. ............ 711/152

* cited by examiner

Primary Examiner—Philip J Chea
(74) Attorney, Agent, or Firm—Pillsbury Winthrop Shaw Pittman LLP

(57) ABSTRACT

A multiple computer system is disclosed in which the local memory of each computer (M1, M2, . . . Mn) can be different having some memory locations (A, B) which are replicated in other computers and other memory locations (E) which are not. When any computer seeks to acquire or release a synchronizing lock a check (171, 181) is made to see if the relevant memory location is present on any other machine. If yes, synchronization is carried out. However, if no, then no synchronization is required and the synchronizing procedures are by-passed.

10 Claims, 6 Drawing Sheets

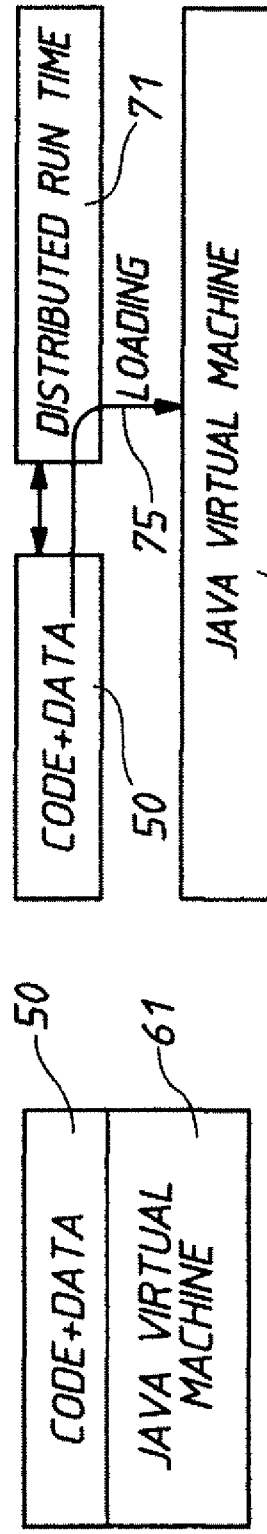
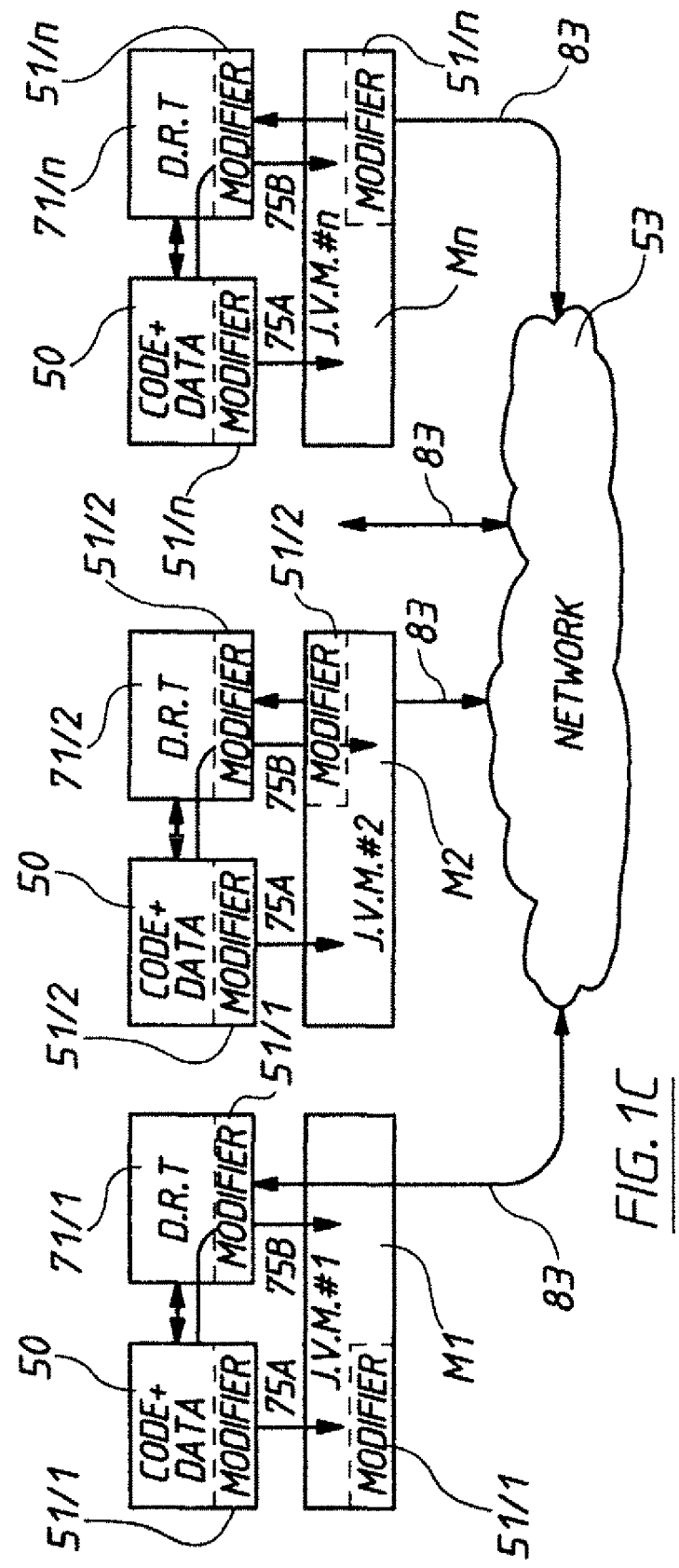
FIG. 1A PRIOR ART
FIG. 1B PRIOR ART
FIG. 1C

| TABLE I | |
|---|---|
| OBJECTS | MACHINES |
| A | M1   M2 |
| B | M1   M2   M4 |
| C | M1   M2   M3 |
| D | M2   M4 |
| E | M3 |

FIG.3

| TABLE II | |
|---|---|
| MACHINES | OBJECTS |
| M1 | A   B   C |
| M2 | A   B   C   D |
| M3 | C , E |
| M4 | B , D |

FIG.4

|   | M1 | M2 | M3 | M4 |   |   | Mn |
|---|----|----|----|----|---|---|----|
| A | YES | YES | NO | NO |  |  |  |
| B | YES | YES | NO | YES |  |  |  |
| C | YES | YES | YES | NO |  |  |  |
| D | NO | YES | NO | YES |  |  |  |
| E | NO | NO | YES | NO |  |  |  |
|   |    |    |    |    |   |   |    |
| Z |    |    |    |    |   |   |    |

FIG.5

SYNCHRONIZATION WITH PARTIAL MEMORY REPLICATION

CROSS-REFERENCE TO RELATED APPLICATIONS

The present application claims the benefit of priority to U.S. Provisional Application Nos. 60/850,450 and 60/850,537, both filed 9 Oct. 2006; and to Australian Provisional Application Nos. 2006905535 and 2006905534, both filed on 5 Oct. 2006, each of which are hereby incorporated herein by reference.

This application is related to concurrently filed U.S. Application entitled "Synchronization with Partial Memory Replication," (60/850,450) and concurrently filed U.S. Application entitled "Synchronization with Partial Memory Replication," (60/850,537), each of which are hereby incorporated herein by reference.

FIELD OF THE INVENTION

The present invention relates to computing and, in particular, to synchronization. The present invention finds particular application to the simultaneous operation of a plurality of computers interconnected via a communications network.

BACKGROUND

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 (WO2006/110,937) to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 (WO2007/110,957) both in the name of the present applicant and both unpublished as at the priority date of the present application, also disclose further details. The contents of the specification of each of the abovementioned prior application(s) are hereby incorporated into the present specification by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

Australian Patent Application No. 2005 905 582 entitled "Modified Machine Architecture with Partial Updating" lodged 10 Oct. 2005, (to which International Application No. PCT/AU2006/001447 (WO2007/041762) and U.S. patent application Ser. No. 11/583,958 (60/730,543) correspond)(s); Australian Patent Application No. 2005 905 581 entitled "Multiple Computer System with Enhanced Memory Clean Up" also lodged 10 Oct. 2005 (to which International Application No. PCT/AU2006/001448 (WO2007/041762) and U.S. patent application Ser. No. 11/583,991 (60/730,408) correspond)(s); and Australian Patent Application No. 2005 905 734 entitled 'Multiple Machine Architecture with Overhead Reduction" lodged 17 Oct. 2005(to which International Patent Application No. PCT/AU2006/001451 (WO2007/045014) and U.S. patent application Ser. No. 11/583,359 (60/730,544) correspond)(s) all disclose that it is not necessary for all memory locations, objects, assets, etc in any one computer to be replicated in all the other computers. Instead a partial memory replication will suffice. The contents of all the last mentioned patent specifications are hereby incorporated into the present specification by cross reference for all purposes.

Briefly stated, the three last mentioned patent specifications disclose that memory locations, assets, objects, classes, etc. of a specific computer can be categorised into two groups, those that need to be referenced or otherwise consulted by another computer, and those that don't. The membership of the groups can be maintained up to date as the application program execution progresses by maintaining one or more tables or other such listings, the contents of which are regularly updated. The three abovementioned patent specifications are concerned mainly with reducing the amount of data which needs to be transferred between the multiple computers or machines via the communications network 53 which interconnects the computers.

GENESIS OF THE INVENTION

The first abovementioned PCT application discloses the need to grant and release a synchronizing lock to ensure that the replicated memory is maintained self-coherent, or at least substantially self-coherent. The present invention is directed to synchronization in the circumstances of partial memory replication.

SUMMARY OF THE INVENTION

In accordance with a first aspect of the present invention there is disclosed in a multiple computer environment in which a plurality of computers are all interconnected via a communications network and substantially simultaneously execute corresponding different portions of an application program written to be executed only on a single computer, and in which each computer has an independent local memory which is not necessarily identical, the improvement comprising the steps of:

(i) prior to acquiring or releasing a synchronizing lock on a specific local memory location checking to see if that memory location is replicated in the local memory of any other computer, and (ii) by-passing acquiring or releasing said lock only if said specific memory location is not replicated on at least one other computer.

In accordance with a second aspect of the present invention there is disclosed a computer program product comprising a set of program instructions stored in a storage medium and operable to permit a plurality of computers to carry out the above defined method.

In accordance with a third aspect of the present invention there is disclosed a plurality of computers interconnected via a communications network and operable to ensure carrying out of the above described method.

In accordance with a fourth aspect of the present invention there is disclosed a multiple computer system comprising a plurality of computers all interconnected via a communications network, each having an independent local memory and each substantially simultaneously operating a corresponding different portion of an applications program written to be executed only on a single computer, said local memory of each said computer not necessarily being identical, wherein each said computer includes a check means to check prior to acquiring or releasing a synchronizing lock on a specific local memory location, to see if that memory location is replicated in the local memory of any other computer, said check means by-passing said lock acquisition or release only if said specific memory location is not replicated on at least one other computer.

In accordance with this aspect of the present invention there is disclosed a single computer adapted to carry out the above method, or cooperate with other computers to form the above-mentioned multiple computer system.

BRIEF DESCRIPTION OF THE DRAWINGS

Embodiments of the present invention will now be described with reference to the drawings in which:

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server, FIGS. 3, 4 and 5 illustrate three different forms of tabulation or listing of the memory resources in a partial memory updating arrangement and substantially duplicate the content of FIGS. 3-5 of Australian Patent Application No. 2005 905 734 or WO2007/045014 or U.S. Ser. No. 11/583,359 referred to above.

DETAILED DESCRIPTION

Figure 2:
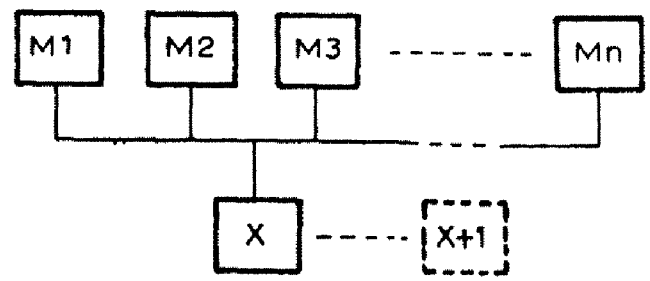
FIG. 2A is a schematic representation of an RSM multiple computer system.
FIG. 2B is a similar schematic representation of a partial or hybrid RSM multiple computer system.

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified by the present applicant by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM# 1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, there is no restriction to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included is either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing the above-described arrangements may optionally be connected to or coupled with other computers, machines, information appliances, or the like that do not implement the abovedescribed arrangements.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT 71 and in other embodiments implemented as an adjunct to the application code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chipset. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one arrangement, the analysis or scrutiny of the application code 50 takes place during the loading of the application program code such as by the operating system reading the application code 50 from the hard disk or other storage device, medium or source and copying it into memory and preparing to begin execution of the application program code. In another arrangement, in a JAVA virtual machine, the analysis or scrutiny may take place during the class loading procedure of the java.lang.ClassLoader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code. All such modification routes are envisaged and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some arrangements this replicated memory structure will be identical. Whilst in other arrangements this memory structure will have portions that are identical and other portions that are not. In still other arrangements the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The arrangement is transport, network, and communications path independent, and does not depend on how the communication between machines or DRTs takes place. Even electronic mail (email) exchanges between machines or DRTs may suffice for the communications.

In connection with the above, it will be seen from FIG. 2 that there are a number of machines M1, M2, . . . Mn, "n" being an integer greater than or equal to two, on which the application program 50 of FIG. 1A is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the abovedescribed arrangements, if desired. However this would result in generally undesirable complexity. If the machine X is not provided then its functions, such as housekeeping functions, are provided by one, or some, or all of the other machines.

Figure 2A:
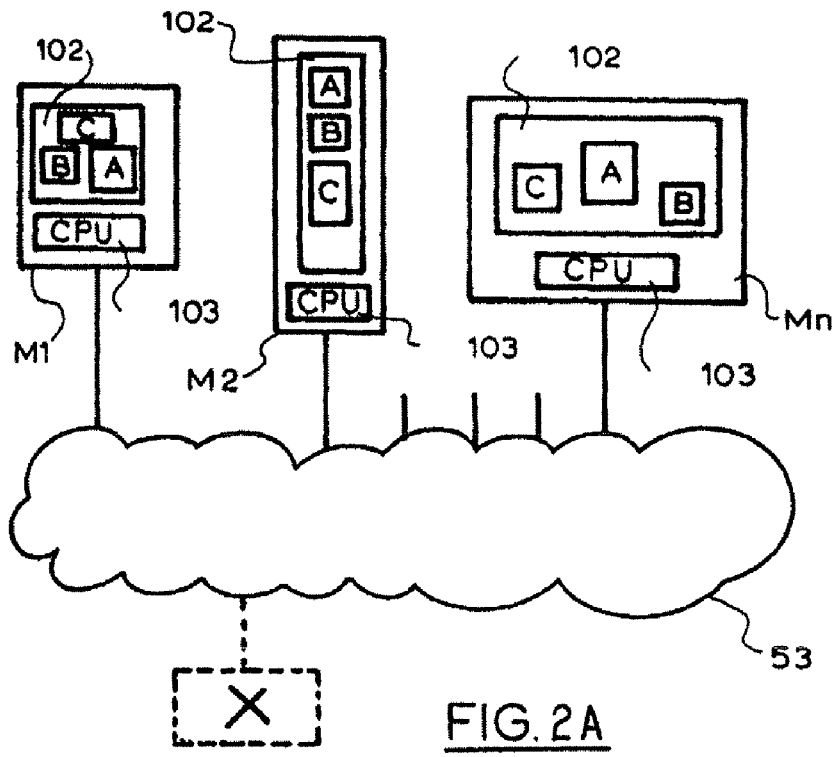

FIG. 2A is a schematic diagram of a replicated shared memory system. In FIG. 2A three machines are shown, of a total of "n" machines (n being an integer greater than one) that is machines M1, M2, . . . Mn. Additionally, a communications network 53 is shown interconnecting the three machines and a preferable (but optional) server machine X which can also be provided and which is indicated by broken lines. In each of the individual machines, there exists a memory 102 and a CPU 103. In each memory 102 there exists three memory locations, a memory location A, a memory location B, and a memory location C. Each of these three memory locations is replicated in a memory 102 of each machine.

This arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network 53. In International Patent Application No PCT/AU2005/001641 (WO2006/110,937) to which U.S. patent application Ser. No. 11/259,885 entitled: "Computer Architecture Method of Operation for Multi-Computer Distributed Processing and Co-ordinated Memory and Asset Handling" corresponds, a technique is disclosed to detect modifications or manipulations made to a replicated memory location, such as a write to a replicated memory location A by machine M1 and correspondingly propagate this changed value written by machine M1 to the other machines M2 . . . Mn which each have a local replica of memory location A. This result is achieved by the preferred embodiment of detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

Figure 2B:
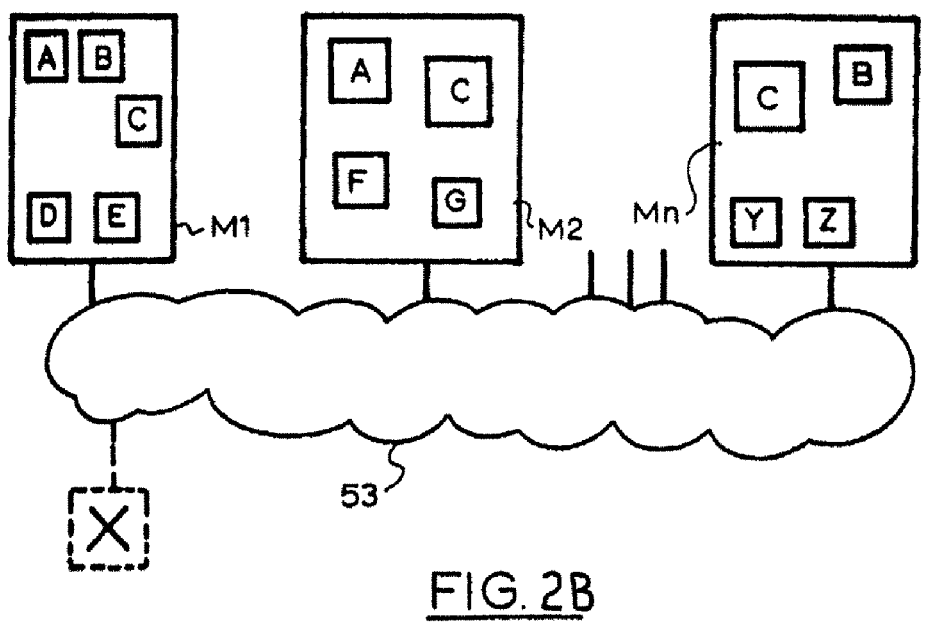

An alternative arrangement is that illustrated in FIG. 2B and termed partial or hybrid replicated shared memory (RSM). Here memory location A is replicated on computers or machines M1 and M2, memory location B is replicated on machines M1 and Mn, and memory location C is replicated on machines M1, M2 and Mn. However, the memory locations D and E are present only on machine M1, the memory locations F and G are present only on machine M2, and the memory locations Y and Z are present only on machine Mn. Such an arrangement is disclosed in Australian Patent Application No. 2005 905 582 (to which U.S. patent application Ser. No. 11/583,958 (60/730,543) and PCT/AU2006/001447 (WO2007/041762) correspond). In such a partial or hybrid RSM systems changes made by one computer to memory locations which are not replicated on any other computer do not need to be updated at all. Furthermore, a change made by any one computer to a memory location which is only replicated on some computers of the multiple computer system need only be propagated or updated to those some computers (and not to all other computers).

Consequently, for both RSM and partial RSM, a background thread task or process is able to, at a later stage, propagate the changed value to the other machines which also replicate the written to memory location, such that subject to an update and propagation delay, the memory contents of the written to memory location on all of the machines on which a replica exists, are substantially identical. Various other alternative embodiments are also disclosed in the abovementioned specification.

Turning now to FIGS. 3-5, three schematic lists or tabulations of the memory locations of four machines M1-M4 are illustrated. In this particular example, machine M1 has the memory locations A, B and C whilst machine M2 has the same memory locations and an additional memory location D. However, machine M3 only has memory locations C and E whilst machine M4 has memory locations B and D.

In Table 1 of FIG. 3 the memory locations, objects, assets, etc are listed in the left hand column and the machines having these assets, etc. are listed in the right hand column. In Table II of FIG. 4 the reverse situation applies. In FIG. 5 a listing in the form of an entire memory map is provided. Other variations will be apparent to those skilled in the art.

In relation to synchronization, since, say, object A is present on machines M1 and M2, then if either of these machines needs to utilize this object or resource, then the other machine must be prevented from substantially simultaneously attempting to utilize this resource. Thus synchronization is necessary in respect of objects such as A.

However, since object A is not present on all machines, no attempt need be made to send a lock to those machines which do not have object A. Thus the synchronisation overhead is normally reduced since the volume of messages required to be sent over the network 53 is reduced.

Furthermore, since object E is present only on machine M3 and on no other machine, there is little point in a synchronizing lock being granted to machine M3 in relation to object E since no other machine is capable of accessing that memory location, object, asset, resource, class, etc.

These two considerations can substantially simplify the acquisition and release of synchronizing locks and thereby speed up the overall operation of the system.

The DRT can determine the synchronization state of a replicated object in a number of ways. Preferably, it can ask each machine in turn if their corresponding local replica (copy) of this object is presently synchronized, and if any machine replies true, then to wait until that object is unsynchronised, otherwise synchronize this object locally. Alternatively, it can ask only those machines on which a local replica object resides if their corresponding local replica (copy) of this object is presently synchronized, and if any machine replies true, then to wait until that object is unsynchronised, otherwise synchronize this object locally. This alternative arrangement is beneficial as only those other machines on which a corresponding replica object resides are consulted (asked), and not other machines on which no corresponding local replica object resides. Regardless of which of the above two alternatives is operated, preferably once the requesting machine has determined that no other machine is presently synchronizing their object, then the requesting machine proceeds to acquire the lock locally, and inform the consulted (asked) machines that the requesting machine has acquired the desired lock, as further described below.

Alternatively again, the DRT on the local machine can consult a shared record table (perhaps on a separate machine (eg machine X), or a coherent shared record table on the local machine, or a database) to determine if this object has been marked as synchronized by any other machine, and if so, then wait until the status of the object is changed to "unsynchronised" and then acquire the lock by marking the object as synchronized, or alternative acquire the lock by marking the object as synchronized by this (successful requesting) machine.

If the DRT determines that no other machine currently has a lock for this object (ie, no other machine has synchronized this object), then to acquire the lock for this object on all other machines (or all other machines on which a corresponding local replica object resides), for example by means of modifying the corresponding entry in a shared table of synchronization states, or alternatively, sequentially acquiring the lock on all other machines (or all other machines on which a corresponding local replica object resides) in addition the current machine. Only once this machine has successfully confirmed that no other machine has currently synchronized this object, and this machine has correspondingly synchronized locally, can the execution of the original synchronized code-block begin.

On the other hand, if the DRT determines that another machine has already synchronized this object, then this machine is to postpone execution of the original synchronize code-block until such a time as the DRT can confirm than no other machine is presently executing a synchronize statement for this object, and that this machine has correspondingly synchronized the object locally. In such a case, the original code block is NOT to be executed until this machine can guarantee that no other machine is executing a synchronize statement for this object, as it will potentially corrupt the object across the participating machines due to race-conditions, inconsistency of memory, and so forth resulting from the concurrent execution of synchronized statements. Thus, when the DRT determines that this object is presently "synchronized", the DRT prevents execution of the original code-block by pausing the execution of the "acquireLock( )" operation until such a time as a corresponding "releaseLock( )" operation is executed by the present owner of the lock.

Thus, on execution of a "releaseLock( )" operation, the machine which presently "owns" a lock (ie, is executing a synchronized statement) indicates the close of its synchronized statement, for example by marking this object as "unsynchronised" in the shared table of synchronization states, or alternatively, sequentially releasing locks acquired on all other machines (or all other machines on which a corresponding local replica object resides). At this point, any other machine waiting to begin execution of a corresponding synchronized statement can then claim ownership of this object's lock by resuming execution of its postponed (ie delayed) "acquireLock( )" operation, for example, marking itself as executing a synchronized statement for this object in the shared table of synchronization states, or alternatively, sequentially acquiring local locks on each of the other machines (or on each of the other machines on which a corresponding local replica object resides).

A computer programmer when writing an application program to operate on a single computer using the JAVA language and architecture expects to use a synchronization routine(s) to ensure that an object, asset, etc. is properly synchronized as specified by the programmer and thus is only utilized by one part of the executable code at any single moment in time. If another part of the executable code wishes to use the same object, etc. then the possible confusion is resolved by ensuring that such other executing parts of the application program have to wait until the first part has finished. Thus a single JAVA virtual machine can keep track of utilization of the classes and objects and avoid any corresponding problems as necessary in an unobtrusive fashion. This process whereby only one object or class is exclusively used is termed "synchronization". In the JAVA language the instructions "monitorenter" and "monitorexit" signify the beginning and ending of a synchronization routine which results in the acquiring of, and releasing of, a "lock" respectively which prevents an asset being the subject of attempted simultaneous utilization.

However, in the arrangement illustrated in FIG. 2 whilst one particular machine (say, M3) is exclusively using an object or class, another machine (say M5) may also be instructed by the code it is executing to exclusively use that object or class at that time. Thus if the object or class were to be simultaneously used by both machines, then the behaviour of the object and application as a whole is undefined—that is, in the absence of proper exclusive use of an object when explicitly specified by the programmer, permanent inconsistency between machine M5 and machine M3 is likely to result.

Figure 6:
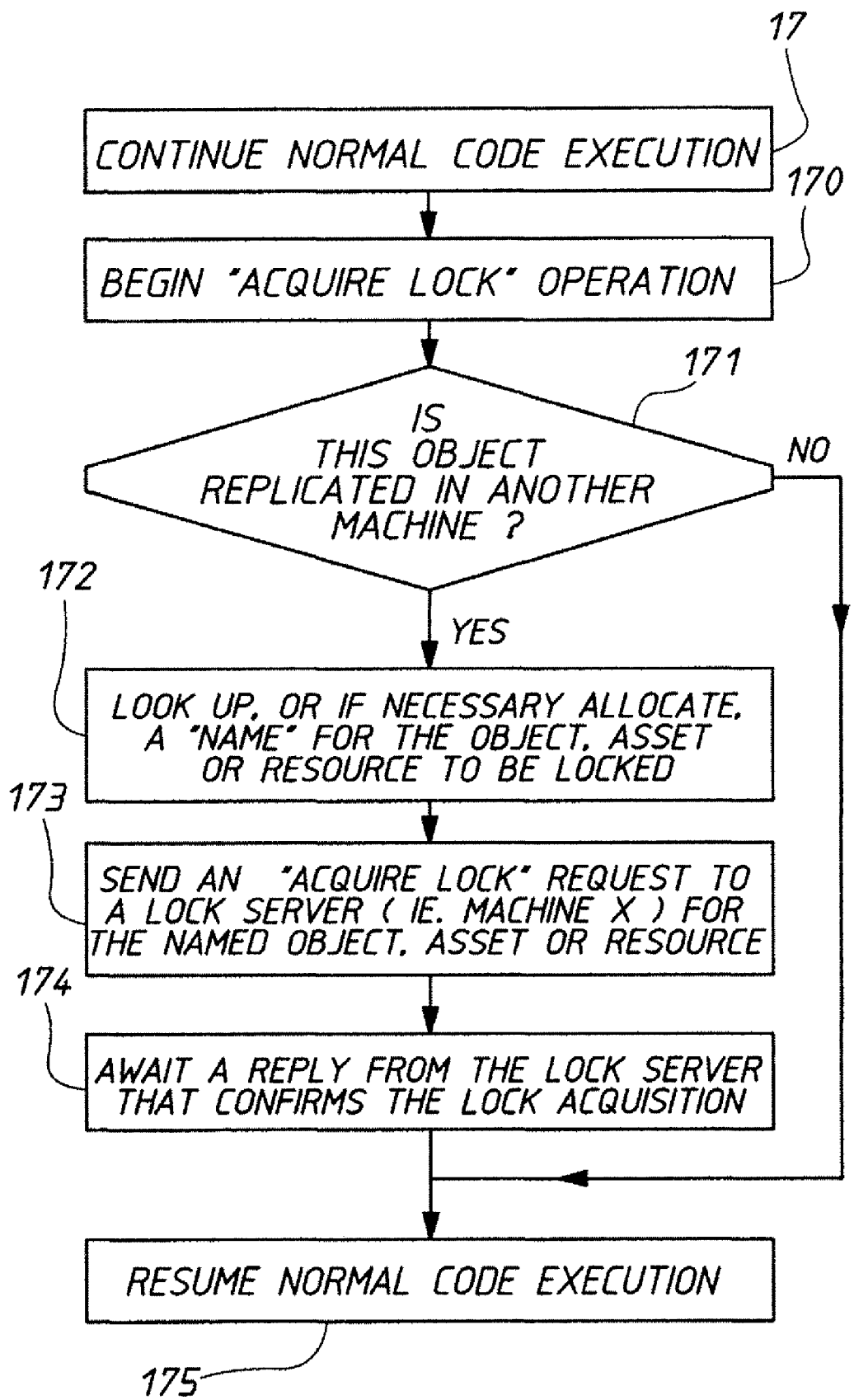
FIG. 6 illustrates in a flow chart the modified actions required in acquiring a synchronizing lock (and is thereby a modification of FIG. 17 of the first abovementioned PCT specification)

FIG. 6 illustrates a particular form of modification. Firstly, the structures, assets or resources (in JAVA termed classes or objects) to be synchronized are preferably allocated a name or tag which can be used globally by all machines. This preferably happens when the classes or objects are originally initialized. This is most conveniently done via a table (eg FIG. 3, 4 or 5) maintained by server machine X. Additionally or alternatively, the tables of FIGS. 3-5 may be maintained substantially similarly for each one of the machines M1 . . . Mn. Additionally, when multiple tables are maintained, one for each machine M1 . . . Mn, preferably such multiple tables are updated to remain substantially similar, such as when a new entry is to be recorded in one table, or an existing entry is changed or manipulated. In a further improved arrangement, the tables maintained by each machine only comprise entries for the objects which are replicated locally, such as for example machine M1 only maintaining entries for objects A, B, and C (but not D and E as D and E are not replicated on machine M1). Regardless of which of the abovedescribed single or multiple table arrangements are used, the single or multiple tables also preferably include the synchronization status of each class or object recorded therein. In the preferred embodiment, these table(s) also preferably include a queue arrangement which stores the identities of machines which have requested exclusive use (e.g. synchronization) of this asset.

As seen in FIG. 6, the initial step 17 is normal code execution as a result of which an "acquire lock" operation for the plural machines begins as indicated at step 170. The next action is to determine whether the object, asset, memory location etc. over which the lock is to be acquired is replicated in another machine. This is indicated at step 171.

If the object is an object such as E which is not replicated in any other machine, then the answer to the question posed in step 171 is "No" and the processing jumps to step 175 and normal/regular local processing/execution can resume as no synchronization lock is needed between the current machine and any other machines, and the entire synchronizing activity for the plural machines is by-passed.

Alternatively, if the object is such as A which is replicated on both machines M1 and M2 then synchronization is required and step 172 is carried out to ascertain the name "A".

In an alternative arrangement of steps 171 and 172, step 172 may precede step 171, so as to first lookup or resolve a name for the object asset or resource sought to be locked in accordance with step 172, and after which such resolved name is utilised in accordance with step 171 determine whether the named object is replicated on at least one other machine or not.

As indicated in step 173 of FIG. 6, next an "acquire lock" request is sent to machine X, after which, the sending machine waits for confirmation of lock acquisition as shown in step 174. Thus, if the global name is already locked (ie the corresponding asset is in exclusive use by another machine other than the machine proposing to acquire the lock) then this means that the proposed synchronization routine of the object or class should be paused until the object or class is unlocked by the current owner.

Alternatively, if the global name is not locked, this means that no other machine is using this class or object, and confirmation of lock acquisition is received straight away. After receipt of confirmation of lock acquisition, normal/regular execution of the local application synchronization routine is allowed to continue, as shown in step 175.

Figure 7:
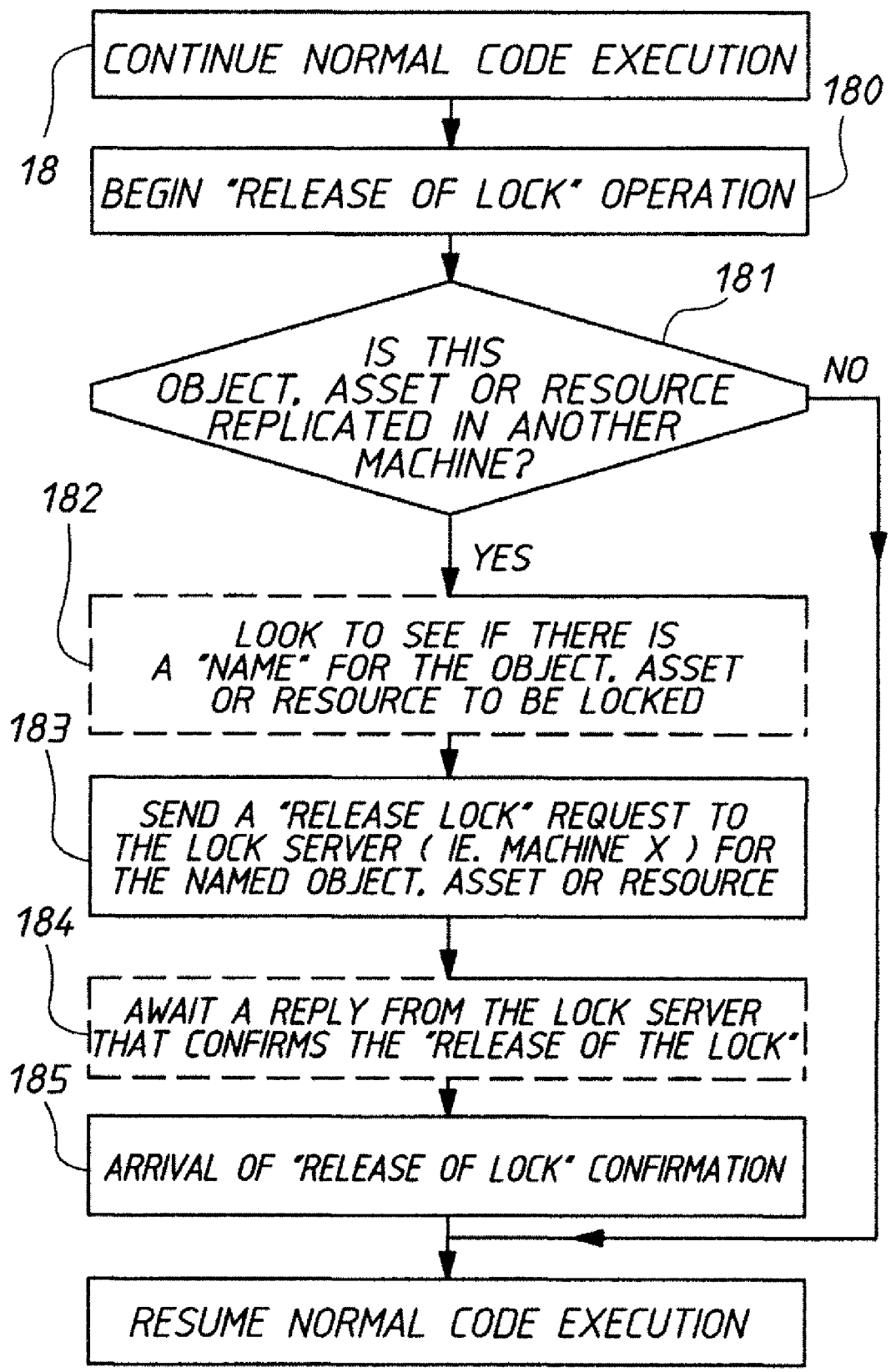
FIG. 7 illustrates in a flow chart the modified actions required in releasing a synchronizing lock (and is thereby a modification of FIG. 18 of the first abovementioned PCT specification).

FIG. 7 shows the corresponding procedures followed by the application program executing machine which wishes to relinquish a lock of the plural machines. From normal/regular execution of code as indicated at step 18, a begin "release of lock" operation is commenced as indicated at step 180. The next action is to determine whether the object, asset, memory location etc over which the lock is to be released is replicated in another machine. This is indicated at step 181.

If the object is an object such as E which is not replicated in any other machine, then the answer to the question posed in step 181 is "No" and the processing jumps to step 185 and normal processing can resume as no synchronization lock of the plural machines has been acquired, and thus none need to be relinquished.

Alternatively, if the object is such as A which is replicated on both machines M1 and M2 then the operation of this proposing machine is temporarily interrupted by steps 183, 184 until the reply is received from machine X, corresponding to step 184, and execution then resumes as indicated in step 185. Optionally, and as indicated by broken lines in step 182, the machine requesting release of a lock is made to look up the "global name" for this lock preceding a request being made to machine X. In this way, multiple locks on multiple machines can be acquired and released without interfering with one another.

In an alternative arrangement of steps 181 and 182, step 182 may precede step 181, so as to first lookup or resolve a name for the object asset or resource sought to be unlocked (released) in accordance with step 182, and after which such resolved name is utilised in accordance with step 181 determine whether the named object is replicated on at least one other machine or not.

The activity carried out by machine X in response to an "acquire lock" enquiry (of FIG. 6) or a "release lock" request (of FIG. 7) is substantially the same as described in the first abovementioned PCT specification, however, it is only required in the event that synchronization is necessary.

To summarize, there is disclosed in a multiple computer environment in which a plurality of computers are all interconnected via a communications network and substantially simultaneously execute corresponding different portions of an same application program written to be executed only on a single computer, and in which each computer has an independent local memory which is not necessarily identical, and wherein at least one application memory location/content is replicated in each of said independent local memories and updated to remain substantially similar, the improvement comprising the steps of:

(i) prior to acquiring or releasing a synchronizing lock on a specific local memory location checking to see if that memory location is replicated in the local memory of any other computer, and (ii) by-passing acquiring or releasing the lock only if the specific memory location is not replicated on at least one other computer.

Preferably the method includes the further step of:

(iii) carrying out step (i) by consulting a look up table listing the memory locations and the computers.

Preferably the method includes the further step of:

(iv) maintaining the look up table in a server computer.

Also disclosed is a multiple computer system comprising a plurality of computers all interconnected via a communications network, each having an independent local memory and each substantially simultaneously operating a corresponding different portion of an applications program written to be executed only on a single computer, the local memory of each the computer not necessarily being identical, and wherein at least one application memory location/content is replicated in each of said independent local memories and updated to remain substantially similar, wherein each the computer includes a check means to check prior to acquiring or releasing a synchronizing lock on a specific local memory location, to see if that memory location is replicated in the local memory of any other computer, the check means by-passing the lock acquisition or release only if the specific memory location is not replicated on at least one other computer.

Preferably a look up table listing the memory locations and the computers is available to the check means.

Preferably the look up table is located in a server computer.

In addition there is disclosed a computer program product incorporating instructions to carry out the abovementioned method(s).

Furthermore, there is also disclosed a multiple computer system in which each computer is loaded with the computer program product as referred to above.

Further, there is disclosed a single computer configured to carry out the above method(s) as or adapted to co-operate with other computers so as to form the above multiple computer system.

Additionally, a computer program product is disclosed comprising a set of program instructions stored in a storage medium and operable to permit one or a plurality of computers to carry out the above method or methods.

The foregoing describes only some embodiments of the present invention and modifications, obvious to those skilled in the computing arts, can be made thereto without departing from the scope of the present invention. The terms "synchronization routine" or "acquiring/releasing a lock" as used herein are understood to include within their scope synchronization methods such as those methods which are flagged as synchronized in their method descriptors in the JAVA platform/language.

Similarly, the above described arrangements envisage n computers each of which shares a fraction (1/n th) of the application program. Under such circumstances all n computers have the same local memory structure. However, it is possible to operate such a system in which a subset only of the computers has the same local memory structure. Under this scenario, the maximum number of members of the subset is to be regarded as n in the description above.

It is also to be understood that the memory locations can include both data and also portions of code. Thus the new values or changes made to the memory locations can include both new numerical data and new or revised portions of code.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) a pre-compilation procedure prior to loading,
(iii) compilation prior to loading,
(iv) "just-in-time" compilation(s), or
(v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Given the fundamental concept of modifying memory manipulation operations to coordinate operation between and amongst a plurality of machines M1, M2 . . . Mn, there are several different ways in which this coordinated, coherent and consistent memory state and manipulation operation concept, method, and procedure may be carried out or implemented.

In the first way, a particular machine, say machine M2, loads the asset (such as class or object) inclusive of memory manipulation operation(s), modifies it, and then loads each of the other machines M1, M3 . . . Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one way, the memory manipulation operation(s) that is (are) loaded is executable intermediary code.

In this arrangement, which may be termed "master/slave" each of the slave (or secondary) machines M1, M3 . . . Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further arrangement, each machine M1, M2 ... Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this arrangement more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances, the supply or the communication of the asset code (such as class code or object code) to the machines M1, M2 ... Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The abovedescribed arrangement needs to be varied in the situation where the modification relates to a cleanup routine, finalization or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalization or cleanup routine is deleted on all machines except one, and this last machine therefore is the only machine that can execute the finalization routine because all other machines have deleted the finalization routine. One benefit of this approach is that no conflict arises between multiple machines executing the same finalization routine because only one machine has the routine.

The process of deleting the cleanup routine in its entirety can either be performed by the "master" machine (such as for example machine M2 or some other machine such as machine X) or alternatively by each other machine M1, M3 ... Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 ... Mn and optionally the server machine X.

In a further arrangement, a particular machine, say for example machine M1, loads the unmodified asset (such as class or object) inclusive of a finalization or cleanup routine and all the other machines M2, M3 ... Mn perform a modification to delete the cleanup routine of the asset (such as class or object) and load the modified version.

In a still further arrangement, the machines M1, M2 ... Mn, may send some or all load requests to the additional server machine X, which performs the modification to the application program code 50 (including or consisting of assets, and/or classes, and/or objects) and inclusive of finalization or cleanup routine(s), via any of the abovementioned methods, and returns in the modified application program code inclusive of the now modified finalization or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalization or cleanup routine(s) to each machine. The modifications performed by machine X can include any of the modifications described. This arrangement may of course be applied to some only of the machines whilst other arrangements described herein are applied to others of the machines.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. The above is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. Any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another arrangement the implementation may be in firmware and in other arrangements may be in hardware. Furthermore, any one or each of these various implementation may be a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore be constituted by a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system The term "distributed runtime system", "distributed runtime", or "DRT" and such similar terms used herein are intended to capture or include within their scope any application support system (potentially of hardware, or firmware, or software, or combination and potentially comprising code, or data, or operations or combination) to facilitate, enable, and/or otherwise support the operation of an application program written for a single machine (e.g. written for a single logical shared-memory machine) to instead operate on a multiple computer system with independent local memories and operating in a replicated shared memory arrangement. Such DRT or other "application support software" may take many forms, including being either partially or completely implemented in hardware, firmware, software, or various combinations therein.

The methods described herein are preferably implemented in such an application support system, such as DRT described in International Patent Application No. PCT/AU2005/000580 published under WO 2005/103926 (and to which U.S. patent application Ser. No. 111/111,946 corresponds), however this is not a requirement of this invention. Alternatively, an implementation of the methods of this invention may comprise a functional or effective application support system (such as a DRT described in the abovementioned PCT specification) either in isolation, or in combination with other softwares, hardwares, firmwares, or other methods of any of the above incorporated specifications, or combinations therein.

The reader is directed to the abovementioned PCT specification for a full description, explanation and examples of a distributed runtime system (DRT) generally, and more specifically a distributed runtime system for the modification of application program code suitable for operation on a multiple computer system with independent local memories functioning as a replicated shared memory arrangement, and the subsequent operation of such modified application program code on such multiple computer system with independent local memories operating as a replicated shared memory arrangement.

Also, the reader is directed to the abovementioned PCT specification for further explanation, examples, and description of various anticipated methods and means which may be used to modify application program code during loading or at other times.

Also, the reader is directed to the abovementioned PCT specification for further explanation, examples, and description of various anticipated methods and means which may be used to modify application program code suitable for operation on a multiple computer system with independent local memories and operating as a replicated shared memory arrangement.

Finally, the reader is directed to the abovementioned PCT specification for further explanation, examples, and description of various methods and means which may be used to operate replicated memories of a replicated shared memory arrangement, such as updating of replicated memories when one of such replicated memories is written-to or modified.

In alternative multicomputer arrangements, such as distributed shared memory arrangements and more general distributed computing arrangements, the above described methods may still be applicable, advantageous, and used. Specifically, any multi-computer arrangement where replica, "replica-like", duplicate, mirror, cached or copied memory locations exist, such as any multiple computer arrangement where memory locations (singular or plural), objects, classes, libraries, packages etc are resident on a plurality of connected machines and preferably updated to remain consistent, then the methods are applicable. For example, distributed computing arrangements of a plurality of machines (such as distributed shared memory arrangements) with cached memory locations resident on two or more machines and optionally updated to remain consistent comprise a functional "replicated memory system" with regard to such cached memory locations, and is to be included within the scope of the present invention. Thus, it is to be understood that the aforementioned methods apply to such alternative multiple computer arrangements. The above disclosed methods may be applied in such "functional replicated memory systems" (such as distributed shared memory systems with caches) mutatis mutandis.

It is also provided and envisaged that any of the described functions or operations described as being performed by an optional server machine X (or multiple optional server machines) may instead be performed by any one or more than one of the other participating machines of the plurality (such as machines M1, M2, M3 . . . Mn of FIG. 2A).

Alternatively or in combination, it is also further provided and envisaged that any of the described functions or operations described as being performed by an optional server machine X (or multiple optional server machines) may instead be partially performed by (for example broken up amongst) any one or more of the other participating machines of the plurality, such that the plurality of machines taken together accomplish the described functions or operations described as being performed by an optional machine X. For example, the described functions or operations described as being performed by an optional server machine X may broken up amongst one or more of the participating machines of the plurality.

Further alternatively or in combination, it is also further provided and envisaged that any of the described functions or operations described as being performed by an optional server machine X (or multiple optional server m0achines) may instead be performed or accomplished by a combination of an optional server machine X (or multiple optional server machines) and any one or more of the other participating machines of the plurality (such as machines M1, M2, M3 . . . Mn), such that the plurality of machines and optional server machines taken together accomplish the described functions or operations described as being performed by an optional single machine X. For example, the described functions or operations described as being performed by an optional server machine X may broken up amongst one or more of an optional server machine X and one or more of the participating machines of the plurality.

Various record storage and transmission arrangements may be used when implementing this invention. One such record or data storage and transmission arrangement is to use "tables", or other similar data storage structures. Regardless of the specific record or data storage and transmission arrangements used, what is important is that the replicated written-to memory locations are able to be identified, and their updated values (and identity) are to be transmitted to other machines (preferably machines of which a local replica of the written-to memory locations reside) so as to allow the receiving machines to store the received updated memory values to the corresponding local replica memory locations.

Thus, the methods of this invention are not to be restricted to any of the specific described record or data storage or transmission arrangements, but rather any record or data storage or transmission arrangement which is able to accomplish the methods of this invention may be used.

Specifically with reference to the described example of a "table", the use of a "table" storage or transmission arrangement (and the use of the term "table" generally) is illustrative only and to be understood to include within its scope any comparable or functionally equivalent record or data storage or transmission means or method, such as may be used to implement the methods of this invention.

The terms "object" and "class" used herein are derived from the JAVA environment and are intended to embrace similar terms derived from different environments, such as modules, components, packages, structs, libraries, and the like.

The use of the term "object" and "class" used herein is intended to embrace any association of one or more memory locations. Specifically for example, the term "object" and "class" is intended to include within its scope any association of plural memory locations, such as a related set of memory locations (such as, one or more memory locations comprising an array data structure, one or more memory locations comprising a struct, one or more memory locations comprising a related set of variables, or the like).

Reference to JAVA in the above description and figures includes, together or independently, the JAVA language, the JAVA platform, the JAVA architecture, and the JAVA virtual machine. Additionally, the present invention is equally applicable mutatis mutandis to other non-JAVA computer languages (including for example, but not limited to any one or more of, programming languages, source-code languages, intermediate-code languages, object-code languages, machine-code languages, assembly-code languages, or any other code languages), machines (including for example, but not limited to any one or more of, virtual machines, abstract machines, real machines, and the like), computer architectures (including for example, but not limited to any one or more of, real computer/machine architectures, or virtual computer/machine architectures, or abstract computer/machine architectures, or microarchitectures, or instruction set architectures, or the like), or platforms (including for example, but not limited to any one or more of, computer/computing platforms, or operating systems, or programming languages, or runtime libraries, or the like).

Examples of such programming languages include procedural programming languages, or declarative programming languages, or object-oriented programming languages. Further examples of such programming languages include the Microsoft.NET language(s) (such as Visual BASIC, Visual BASIC.NET, Visual C/C++, Visual C/C++.NET, C#, C#.NET, etc), FORTRAN, C/C++, Objective C, COBOL, BASIC, Ruby, Python, etc.

Examples of such machines include the JAVA Virtual Machine, the Microsoft.NET CLR, virtual machine monitors, hypervisors, VMWare, Xen, and the like.

Examples of such computer architectures include, Intel Corporation's x86 computer architecture and instruction set architecture, Intel Corporation's NetBurst microarchitecture, Intel Corporation's Core microarchitecture, Sun Microsystems' SPARC computer architecture and instruction set architecture, Sun Microsystems' UltraSPARC III microarchitecture, IBM Corporation's POWER computer architecture and instruction set architecture, IBM Corporation's POWER4/POWER5/POWER6 microarchitecture, and the like.

Examples of such platforms include, Microsoft's Windows XP operating system and software platform, Microsoft's Windows Vista operating system and software platform, the Linux operating system and software platform, Sun Microsystems' Solaris operating system and software platform, IBM Corporation's AIX operating system and software platform, Sun Microsystems' JAVA platform, Microsoft's NET platform, and the like.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine.

It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method, and computer program and computer program product disclosed herewith are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

In the JAVA language memory locations include, for example, both fields and elements of array data structures. The above description deals with fields and the changes required for array data structures are essentially the same mutatis mutandis.

Any and all embodiments of the present invention are able to take numerous forms and implementations, including in software implementations, hardware implementations, silicon implementations, firmware implementation, or software/hardware/silicon/firmware combination implementations.

Various methods and/or means are described relative to embodiments of the present invention. In at least one embodiment of the invention, any one or each of these various means may be implemented by computer program code statements or instructions (including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

For ease of description, some or all of the indicated memory locations herein may be indicated or described to be replicated on each machine (as shown in FIG. 2A), and therefore, replica memory updates to any of the replicated memory locations by one machine, will be transmitted/sent to all other machines. Importantly, the methods and embodiments of this invention are not restricted to wholly replicated memory arrangements, but are applicable to and operable for partially replicated shared memory arrangements mutatis mutandis (e.g. where one or more memory locations are only replicated on a subset of a plurality of machines, such as shown in FIG. 2B).

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

With reference to FIG. 2B, where memory location "A" is replicated on two machines M1 and M2 of a three machine replicated shared memory arrangement (comprising an additional machine M3), then for the purposes of this invention the term replicated shared memory arrangement is not to be restricted to all 3 machines M1-M3, but may be also encompass any lesser plurality of machines (less than the total number of machines) in the operating arrangement, such as for example machines M1-M2. Thus, machines M1 and M2 with replicated memory location "A" constitute a replicated shared memory arrangement in their own right (without machine M3).

The term "Acquire lock" used herein is to be understood to include within its scope a commencement of operation or execution of a mutual exclusion operation, generally corresponding to a particular asset such as a particular memory location or machine resource, and result in the asset corresponding to the mutual exclusion operation being locked with respect to some or all modes of simultaneous or concurrent use, execution or operation. Similarly, the term "Release lock" used herein is to be understood to include within its scope any terminated or otherwise discontinued operation or execution of a mutual exclusion operation, generally corresponding to a particular asset such as a particular memory location or machine resource, and result in the asset corresponding to the mutual exclusion operation being unlocked with respect to some or all modes of simultaneous or concurrent use, execution or operation.

It will be appreciated that synchronization means or implies "exclusive use" or "mutual exclusion" of an asset or resource. Conventional structures and methods for implementations of single computers or machines have developed some methods for synchronization on such single computer or machine configurations. It will therefore be understood in light of the description provided here that the invention further includes any means of implementing thread-safety, regardless of whether it is through the use of locks (lock/ unlock), synchronizations, monitors, semphafores, mutexes, or other "mutual-exclusion"-like mechanisms.

The term "comprising" (and its grammatical variations) as used herein is used in the inclusive sense of "having" or "including" and not in the exclusive sense of "consisting only of".

I claim:

1. A multiple computer system comprising:
   a plurality of computers all interconnected via a communications network;
   each of said plurality of computers having a local memory and each of said plurality of computers operating a corresponding different portion of an applications program written to be executed only on a single computer, said local memory of each said computer not necessarily being identical, at least some memory locations of each said computer being replicated in at least one other of said computers, and said local memory of each said computer being independent such that all memory read requests of each said computer are satisfied by reading the independent local memory of the requesting computer; and
   each of said plurality of computers includes a check means for checking, prior to acquiring or releasing a synchronizing lock on a specific local memory location, to determine if that memory location is replicated in the local memory of any other of said plurality of computers, said check means by-passing said lock acquisition or release only if said specific memory location is not replicated on at least one other computer.

2. The multiple computer system as in claim 1, wherein a look-up table listing said memory locations and said computers is available to said check means.

3. The multiple computer system as in claim 2, wherein said look-up table is located in a server computer.

4. The multiple computer system as in claim 1, wherein said look-up table is located in a server computer.

5. The multiple computer system as in claim 2, wherein said look-up table is implemented as a synchronizing lock data structure comprising:
   a look-up table storing a plurality of memory location identifiers for independent local memory locations in each of a plurality of computers; and
   a replication indicator for indicating if a memory location for which it is desired to acquire or release a synchronizing lock is then currently replicated in the local memory of any other one of the plurality of computers.

6. The multiple computer system as in claim 1, further comprising a data structure query means for querying a data structure to determine if a memory location for which it is desired to acquire or release a synchronizing lock is then currently replicated in the local memory of any other one of the plurality of computers.

7. The multiple computer system as in claim 5, wherein each of said plurality of computers is loaded with a computer program product stored in a computer readable media, the computer program including executable computer program instructions and adapted for execution in a processor within a computer or information appliance and a memory coupled with the processor to modify the operation of the computer or information appliance, for modifying the operation of each of the plurality of computers; the modification of operation including performing a method of controlling the acquiring and/or releasing of a synchronizing lock, said method comprising:
   (i) prior to acquiring or releasing a synchronizing lock on a specific local memory location checking to determine if that memory location is replicated in the local memory of any other computer; and
   (ii) by-passing acquiring or releasing said lock only if said specific memory location is not replicated on at least one other computer.

8. The multiple computer system as in claim 7, wherein the computer program product further includes instructions for performing the method including the further step of:
   (iii) carrying out step (i) including by consulting a look-up table listing said memory locations and said computers.

9. The multiple computer system as in claim 8, wherein the computer program product further includes instructions for performing the method including the further step of:
   (iv) maintaining said look-up table in a server computer.

10. At least one computer adapted to co-operate with other computers so as to form a multiple computer system as defined in claim 1.

* * * * *

UNITED STATES PATENT AND TRADEMARK OFFICE
CERTIFICATE OF CORRECTION

PATENT NO. : 7,739,349 B2  Page 1 of 1
APPLICATION NO. : 11/973326
DATED : June 25, 2010
INVENTOR(S) : Holt It is certified that error appears in the above-identified patent and that said Letters Patent is hereby corrected as shown below:

On the title page, item (30) Foreign Application Priority Data, include

--Oct. 5, 2006  (AU) ....................2006905534
  Oct. 5, 2006  (AU)....................2006905535--

Signed and Sealed this

Ninth Day of November, 2010

David J. Kappos
*Director of the United States Patent and Trademark Office*